United States Patent
Moriya et al.

(10) Patent No.: US 10,427,544 B2
(45) Date of Patent: Oct. 1, 2019

(54) VEHICLE DRIVING FORCE CONTROL APPARATUS

(71) Applicant: SUBARU CORPORATION, Tokyo (JP)

(72) Inventors: Fumiyuki Moriya, Tokyo (JP); Hiroshi Ienaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 168 days.

(21) Appl. No.: 15/635,289

(22) Filed: Jun. 28, 2017

(65) Prior Publication Data

US 2018/0079320 A1    Mar. 22, 2018

(30) Foreign Application Priority Data

Sep. 21, 2016 (JP) .................................. 2016-183869

(51) Int. Cl.
*B60L 15/20* (2006.01)

(52) U.S. Cl.
CPC ........... *B60L 15/20* (2013.01); *B60L 2220/42* (2013.01); *B60L 2240/16* (2013.01);
(Continued)

(58) Field of Classification Search
CPC .. B60L 15/20; B60L 2240/18; B60L 2240/16; B60L 2240/46; B60L 2240/443;
(Continued)

(56) References Cited

U.S. PATENT DOCUMENTS

| 7,591,339 B2* | 9/2009 | Sugimoto | B60W 20/13 180/242 |
| 2010/0241304 A1* | 9/2010 | Maeda | B60K 6/52 701/31.4 |

(Continued)

FOREIGN PATENT DOCUMENTS

| DE | 112012006974 T5 | 7/2015 |
| DE | 102015008970 A1 | 1/2016 |

(Continued)

OTHER PUBLICATIONS

Decision to Grant a Patent for JP Patent Application No. 2016-183869, dated Mar. 20, 2018, 03 pages of Office Action and 03 pages of English Translation.

(Continued)

Primary Examiner — Michael J Zanelli
(74) Attorney, Agent, or Firm — Chip Law Group

(57) ABSTRACT

A vehicle driving force control apparatus is mounted in a vehicle provided with a plurality of drive sources, and a plurality of power transmission mechanisms configured to transmit power from the plurality of drive sources to a plurality of wheels or a plurality of sets of wheels. The vehicle driving force control apparatus includes: a ratio determination unit and a command unit. The ratio determination unit determines a target ratio at which a required driving force applied to the vehicle is to be distributed to the plurality of wheels or the plurality of sets of wheels. The command unit commands the plurality of drive sources to output power such that driving force distributed in accordance with the target ratio is generated in the plurality of wheels or the plurality of sets of wheels.

16 Claims, 7 Drawing Sheets

(52) U.S. Cl.
CPC ....... *B60L 2240/18* (2013.01); *B60L 2240/22* (2013.01); *B60L 2240/24* (2013.01); *B60L 2240/425* (2013.01); *B60L 2240/443* (2013.01); *B60L 2240/46* (2013.01); *B60L 2240/461* (2013.01); *B60L 2240/485* (2013.01); *B60L 2260/28* (2013.01); *Y02T 10/645* (2013.01); *Y02T 10/646* (2013.01); *Y02T 10/7275* (2013.01)

(58) Field of Classification Search
CPC ......... B60L 2240/425; B60L 2240/485; B60L 2240/461; B60L 2240/24; B60L 2240/22; B60L 2220/42; B60L 2260/28; Y02T 10/646; Y02T 10/7275; Y02T 10/645
See application file for complete search history.

(56) References Cited

U.S. PATENT DOCUMENTS

| | | | |
|---|---|---|---|
| 2013/0035818 A1* | 2/2013 | Meitinger | B60K 6/448 701/22 |
| 2014/0023654 A1 | 1/2014 | Brown et al. | |
| 2014/0067181 A1 | 3/2014 | Kato et al. | |
| 2015/0057866 A1* | 2/2015 | Tseng | B60W 30/19 701/22 |
| 2015/0274033 A1 | 10/2015 | Katsuyama et al. | |

FOREIGN PATENT DOCUMENTS

| | | |
|---|---|---|
| JP | 2005151691 A | 6/2005 |
| JP | 2009159682 A | 7/2009 |
| JP | 4765552 B2 | 9/2011 |
| JP | 2014-212614 A | 11/2014 |
| JP | 2014217204 A | 11/2014 |
| JP | 2015136980 A | 7/2015 |
| JP | 2016-022885 A | 2/2016 |
| JP | 2016-145010 A | 8/2016 |
| WO | 2012/111159 A1 | 8/2012 |

OTHER PUBLICATIONS

Office Action for DE Patent Application No. 102017119007, dated Oct. 31, 2018, 07 pages of Office Action and 05 pages of English Translation.

* cited by examiner

VEHICLE DRIVING FORCE CONTROL APPARATUS

CROSS-REFERENCE TO RELATED APPLICATIONS

The present application claims priority from Japanese Patent Application No. 2016-183869 filed on Sep. 21, 2016, the entire contents of which are hereby incorporated by reference.

BACKGROUND

1. Technical Field

The present invention relates to a driving force control apparatus for a vehicle having a plurality of drive sources.

2. Related Art

Conventionally, in the field of electric vehicles or hybrid electric vehicles, vehicles that run by transmitting power from a plurality of drive sources to a plurality of wheels have been proposed. In such a vehicle, when required driving force or required torque is applied to the vehicle in response to a driving operation, there is a degree of freedom as to how power is distributed among the plurality of drive sources to obtain such driving force.

Japanese Unexamined Patent Application Publication (JP-A) No. 2015-136980, JP-A No. 2005-151691, JP-A No. 2014-217204, Japanese Patent No. 4765552, and JP-A No. 2009-159682 describe technologies that determine how to distribute the required driving force or required torque among a plurality of running motors. With the technologies described in JP-A No. 2015-136980, JP-A No. 2005-151691, JP-A No. 2014-217204, and Japanese Patent No. 4765552, the required torque or required driving force is distributed in a manner such that the overall energy efficiency increases. With the technology described in JP-A No. 2009-159682, the required torque is distributed taking into account driving stability and energy efficiency.

In a vehicle that runs by transmitting power from a plurality of drive sources to a plurality of wheels, driving stability changes depending on the ratio of driving force distributed to the plurality of wheels. Also, energy loss in drive sources and power transmission mechanisms differs depending on rotation speed and torque. Therefore, in such a vehicle, the driving force is preferably distributed among the plurality of wheels in a manner that improves both driving stability and energy efficiency.

The technology according to JP-A No. 2009-159682 aims to both improve energy efficiency of a plurality of drive sources, and improve driving stability. However, it is thought that the ideal driving force distribution that improves both energy efficiency and driving stability is not obtained with the technology described in JP-A No. 2009-159682.

For instance, with the driving force control apparatus described in JP-A No. 2009-159682, the required torque is distributed at a first distribution ratio that improves energy efficiency if driving is stable, and is distributed at a second distribution ratio that improves driving stability if driving is unstable (see paragraph and FIG. 4 in JP-A No. 2009-159682). However, with such control, hunting occurs in which the distribution ratio switches back and forth between the first distribution ratio and the second distribution ratio (see FIG. 4 in JP-A No. 2009-159682). When hunting occurs, the time that it takes for the distribution ratio of the required torque to transition between the first distribution ratio and the second distribution ratio increases, and as a result, energy efficiency and driving stability decrease.

Also, JP-A No. 2009-159682 also describes balance distribution control in which the driving force control apparatus distributes the required torque at an intermediate value between the first distribution ratio that improves energy efficiency and the second distribution ratio that improves driving stability (see paragraph and FIG. 8 in JP-A No. 2009-159682). However, energy efficiency does not change monotonically with a change in the distribution ratio of the required torque. Therefore, a balance between energy efficiency and driving stability is not achieved even when the distribution ratio is controlled to this intermediate value. In actuality, changing the distribution ratio of the required torque from the intermediate value to one of the first distribution ratio and the second distribution ratio often results in an improvement in both energy efficiency and driving stability.

Also, even when attempting to achieve both energy efficiency and driving stability, the inventors of the present invention thought it preferable to be able to select which of energy efficiency and driving stability to prioritize, and adjust the degree to which it is prioritized, in accordance with the running state. However, with the driving force control apparatus described in JP-A No. 2009-159682, priority is simply switched between energy efficiency and driving stability, depending on whether the same running state has continued for a certain period of time. Therefore, the degree of priority is not adjusted in accordance with various parameters indicative of the running state.

SUMMARY OF THE INVENTION

It is desirable to provide a vehicle driving force control apparatus capable of distributing driving force in a manner such that both energy efficiency and driving stability are improved at the same time, in a vehicle that runs by transmitting power from a plurality of drive sources to a plurality of wheels.

An aspect of the present invention provides a vehicle driving force control apparatus mounted in a vehicle provided with a plurality of drive sources, and a plurality of power transmission mechanisms configured to transmit power from the plurality of drive sources to a plurality of wheels or a plurality of sets of wheels, the vehicle driving force control apparatus including: a ratio determination unit configured to determine a target ratio at which a required driving force applied to the vehicle is to be distributed to the plurality of wheels or the plurality of sets of wheels; and a command unit configured to command the plurality of drive sources to output power such that driving force distributed in accordance with the target ratio is generated in the plurality of wheels or the plurality of sets of wheels. The ratio determination unit includes a reference determining module configured to determine a reference ratio that serves as a reference for a distribution ratio of the required driving force, an allowable range setting module configured to set an allowable range in which a predetermined allowable width is added to the reference ratio, and a ratio selecting module capable of selecting, from the allowable range, a distribution ratio having a running energy loss that is at least less than the running energy loss of the reference ratio. The distribution ratio selected by the ratio selecting module is made the target ratio.

The reference determination unit may change the reference ratio in accordance with a running state of the vehicle.

The reference determination unit may obtain individual variations in the reference ratio associated with values of individual parameters, from among a plurality of types of parameters indicative of the running state, and then obtain an overall variation in the reference ratio by performing a calculation in which the plurality of individual variations obtained for each of the plurality of types of parameters are integrated.

The calculation in which the plurality of individual variations are integrated may be an addition of the plurality of individual variations that have been weighted in association with each of the plurality of types of parameters.

The allowable range setting module may change a width of the allowable width in accordance with a running state of the vehicle.

The allowable range setting module may obtain individual widths of the allowable widths associated with values of individual parameters, from among a plurality of types of parameters indicative of the running state, and set the allowable range using a smallest width, from among the plurality of individual widths obtained for each of the plurality of types of parameters.

The plurality of drive sources may include a front wheel drive source configured to generate a power in a front wheel, and a rear wheel drive source configured to generate a power in a rear wheel. The allowable range setting module may be capable of changing the width of the allowable width on an upper limit side where a distribution ratio to the front wheel drive source increases, and the width of the allowable width on a lower limit side where a distribution ratio to the rear wheel drive source increases, separately in accordance with the running state.

The ratio determination unit may further include a filtering module configured to remove, from the allowable range, a limit-exceeding ratio that causes at least one of the plurality of drive sources to generate an output exceeding a limit, when the allowable range includes the limit-exceeding ratio. The ratio selecting module may select a distribution ratio from the allowable range from which the limit-exceeding ratio has been removed by the filtering module.

The vehicle driving force control apparatus may further include: a steering angle sensor configured to detect a steering angle of the vehicle; a wheel speed sensor configured to detect a wheel speed of the vehicle; and a yaw rate sensor configured to detect an actual yaw rate of the vehicle. The allowable range setting module may make the width on the upper limit side larger than the width on the lower limit side when detection results from the steering angle sensor, the wheel speed sensor, and the yaw rate sensor indicate an understeer tendency.

Another aspect of the present invention provides a vehicle driving force control apparatus mounted in a vehicle that runs by transmitting power from a plurality of drive sources to a plurality of wheels or a plurality of sets of wheels, the vehicle driving force control apparatus including: a ratio determination unit configured to determine a target ratio at which a required driving force applied to the vehicle is to be distributed to the plurality of wheels or the plurality of sets of wheels; and a command unit configured to command the plurality of drive sources to output power such that driving force distributed in accordance with the target ratio is generated in the plurality of wheels or the plurality of sets of wheels. The ratio determination unit includes an allowable range setting module configured to set an allowable range of a ratio at which the required driving force is to be distributed, on the basis of a running state of the vehicle, and a ratio selecting module configured to select one distribution ratio from the allowable range such that a running energy loss decreases. The distribution ratio selected by the ratio selecting module is made the target ratio.

DETAILED DESCRIPTION

Figure 1:
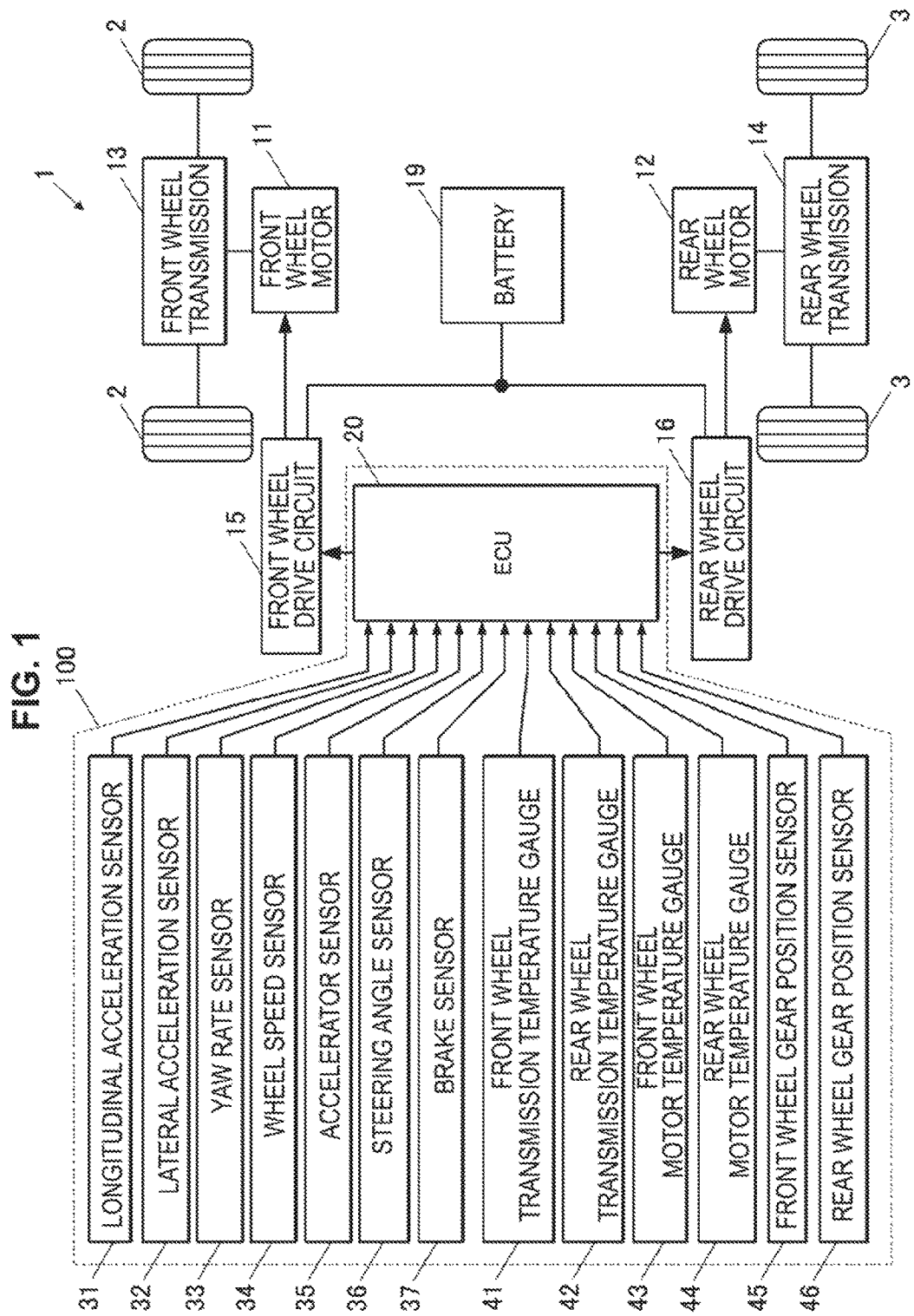
FIG. 1 is a block diagram illustrating a vehicle according to an example of the present invention.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

Hereinafter, an example of the present invention will be described in detail with reference to the accompanying drawings. FIG. 1 is a block diagram illustrating a vehicle according to the example of the present invention.

A vehicle 1 according to the example of the present invention is an electric vehicle (EV), for instance, and has left and right front wheels 2, left and right rear wheels 3, a front wheel motor 11, a rear wheel motor 12, a front wheel transmission 13, and a rear wheel transmission 14. The vehicle 1 also has a front wheel drive circuit 15, a rear wheel drive circuit 16, a battery 19, an electronic control unit (ECU) 20, and a group of sensors (31 to 37 and 41 to 46). Of these, in one example of the invention, the front wheel motor 11 and the rear wheel motor 12 may serve as a plurality of drive sources. In one example of the invention, the plurality of drive sources may serve as a front wheel drive source and a rear wheel drive source. In one example of the invention, the front wheel transmission 13 and the rear wheel transmission 14 may serve as a plurality of power transmission mechanisms. In one example of the invention, the left and right front wheels 2 and the left and right rear wheels 3 may serve as a plurality of sets of wheels.

A driving force control apparatus 100 of the vehicle 1 according to an example of the present invention is mounted in the vehicle 1 and controls the driving force of the front wheels 2 and the driving force of the rear wheels 3. In one example of the invention, the driving force control apparatus 100 may serve as a portion that includes the ECU 20 and the group of sensors (31 to 37 and 41 to 46), of the structures described above.

The front wheel drive circuit 15 converts electric power from the battery 19 and outputs the converted electric power to the front wheel motor 11 in accordance with a command from the ECU 20. The front wheel motor 11 generates power on the basis of this electric power. The front wheel transmission 13 transmits the power from the front wheel motor 11 to the front wheels 2. As a result, driving force is generated in the left and right front wheels 2.

Similarly, the rear wheel drive circuit 16 converts electric power from the battery 19 and outputs the converted electric power to the rear wheel motor 12 in accordance with a command from the ECU 20. The rear wheel motor 12 generates power on the basis of this electric power. The rear wheel transmission 14 transmits the power from the rear wheel motor 12 to the rear wheels 3. As a result, driving force is generated in the left and right rear wheels 3.

The ECU 20 outputs a command such that a required driving force to be applied to the vehicle 1 is distributed between the driving force of the left and right front wheels 2 and the driving force of the left and right rear wheels 3. The required driving force is applied to the vehicle 1 in response to a driving operation by a driver (e.g., a sensor signal from an accelerator sensor 35 indicative of an accelerator operation amount), for instance. The ECU 20 outputs a front wheel motor target torque command to the front wheel drive circuit 15, and outputs a rear wheel motor target torque command to the rear wheel drive circuit 16, to realize the driving force distribution.

The group of sensors includes, for instance, a longitudinal acceleration sensor 31, a lateral acceleration sensor 32, a yaw rate sensor 33, and wheel speed sensor 34, as sensors that detect a running state of the vehicle. The longitudinal acceleration sensor 31 detects acceleration in the longitudinal direction of the vehicle 1. The lateral acceleration sensor 32 detects acceleration in the lateral direction of the vehicle 1. The yaw rate sensor 33 detects the yaw rate of the vehicle 1. The wheel speed sensor 34 detects the wheel speed (rotation speed) of each of the left and right front wheels 2 and left and right rear wheels 3.

The group of sensors also includes an accelerator sensor 35, a steering angle sensor 36, and a brake sensor 37, as sensors that detect a driving operation by the driver. The accelerator sensor 35 detects an accelerator operation amount by the driver. The steering angle sensor 36 detects a steering wheel operation amount by the driver. The brake sensor 37 detects a brake operation amount by the driver.

The group of sensors also includes a plurality of sensors that measure correction parameter values of energy loss caused by running of the vehicle 1. These sensors include a temperature gauge 41 of the front wheel transmission 13, a temperature gauge 42 of the rear wheel transmission 14, a temperature gauge 43 of the front wheel motor 11, and a temperature gauge 44 of the rear wheel motor 12. These sensors also include a front wheel gear position sensor 45 that detects a gear position of the front wheel transmission 13, and a rear wheel gear position sensor 46 that detects a gear position of the rear wheel transmission 14.

Figure 2:
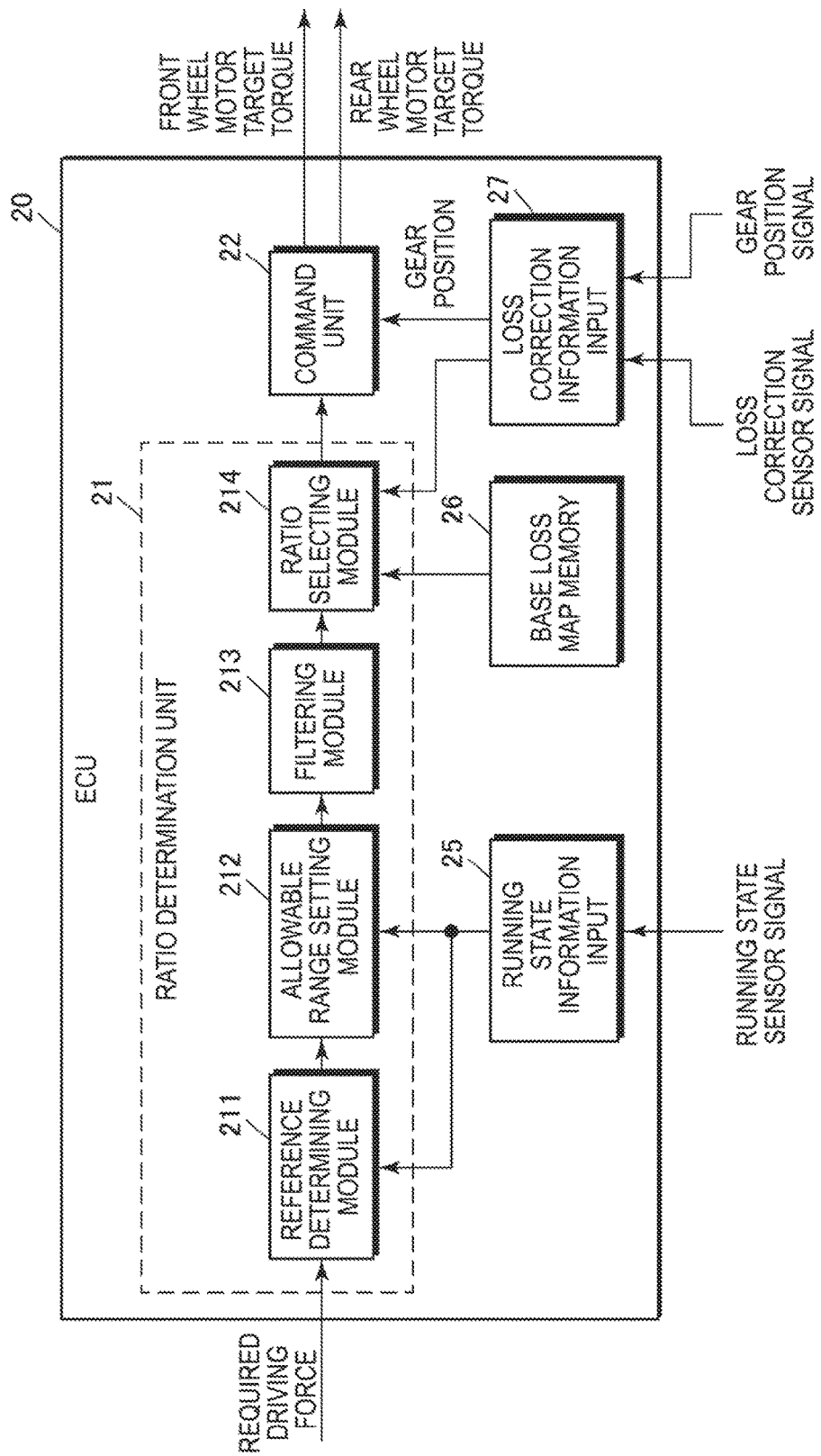
FIG. 2 is a functional block diagram illustrating the internal configuration of an ECU.

FIG. 2 is a functional block diagram illustrating the internal configuration of the ECU.

The ECU 20 has a ratio determination unit 21, a command unit 22, a running state information input 25, base loss map memory 26, and a loss correction information input 27, as illustrated in FIG. 2. The ratio determination unit 21 has a reference determining module 211, an allowable range setting module 212, a filtering module 213, and a ratio selecting module 214. These constituent elements may be formed by software executed by a central processing unit (CPU) of the ECU 20, or they may be formed by hardware.

The ratio determination unit 21 receives the required driving force and determines a target ratio at which to distribute the required driving force to the left and right front wheels 2 and the left and right rear wheels 3.

The command unit 22 receives the target ratio from the ratio determination unit 21, and calculates a target torque for the front wheel motor 11 and a target torque for the rear wheel motor 12 that are required to generate driving force in which the required driving force is distributed at the target ratio, in the left and right front wheels 2 and the left and right rear wheels 3. For this calculation, information about the gear positions of the front wheel transmission 13 and the rear wheel transmission 14 is used in order to know the reduction gear ratio of each power transmission path. The command unit 22 outputs the front wheel motor target torque and the rear wheel motor target torque to the front wheel drive circuit 15 and the rear wheel drive circuit 16, respectively, such that the calculated target torques are output.

The reference determining module 211 determines a reference ratio that will serve as a reference for the distribution ratio of the required driving force. The reference ratio is determined in accordance with the running state of the vehicle, for instance. The reference ratio is a required driving force distribution ratio at which high driving stability is able to be obtained in accordance with the running state of the vehicle.

The allowable range setting module 212 sets an allowable range in which a predetermined allowable width has been added to the reference ratio. The allowable range indicates a range of ratios that can be selected as the required driving force distribution ratio. A range of distribution ratios that are acceptable as long as they do not hinder the driving stability of the vehicle is set for the allowable range. The allowable width that determines the extent of the allowable range is set to change in accordance with the running state of the vehicle. The allowable width on the upper limit side where the distribution ratio of the front wheels 2 becomes larger may be set to a different size than the allowable width on the lower limit side where the distribution ratio of the rear wheels 3 becomes larger.

The filtering module 213 removes any limit-exceeding ratio that calls for the front wheel motor 11 or the rear wheel motor 12 to output torque exceeding an upper limit, should the allowable range include such a limit-exceeding ratio, from the allowable range by a filtering process.

The ratio selecting module 214 selects, as a target ratio, one distribution ratio from the allowable range after the filtering process. The ratio selecting module 214 selects the distribution ratio such that energy loss caused by running is reduced. The energy loss upon which the ratio selecting module 214 bases the determination is the total amount of energy loss generated in the front wheel motor 11, the rear wheel motor 12, the front wheel transmission 13, and the rear wheel transmission 14.

The running state information input 25 receives sensor signals from the sensors that detect the running state of the vehicle, in the group of sensors (31 to 37 and 41 to 46). The running state information input 25 digitally converts the sensor signals to acquire sensor values, and then sends these sensor values to the reference determining module 211 and the allowable range setting module 212.

The base loss map memory 26 stores a base loss map for each of the front wheel motor 11, the rear wheel motor 12, the front wheel transmission 13, and the rear wheel transmission 14. A base loss map is map data for obtaining loss from rotary torque and rotation speed. The loss in each of the front wheel motor 11 and the rear wheel motor 12 changes depending on the operating temperature. Also, the loss in each of the front wheel transmission 13 and the rear wheel transmission 14 changes in accordance with the operating temperature and the gear position. The base loss map is map data indicating each loss not including these change amounts. The actual loss can be obtained by applying a correction based on information about the operating temperature or the gear position, to the base loss map. The ratio selecting module 214 is able to read the base loss map from the base loss map memory 26.

The loss correction information input 27 receives sensor signals from the sensors that detect the energy loss correction parameter values, in the group of sensors (31 to 37 and 41 to 46). The loss correction information input 27 digitally converts the sensor signals to acquire sensor values, and then sends these sensor values to the ratio selecting module 214. Also, information about the gear position acquired here is sent to the command unit 22.

<Driving Force Distribution Process>

Figure 3:
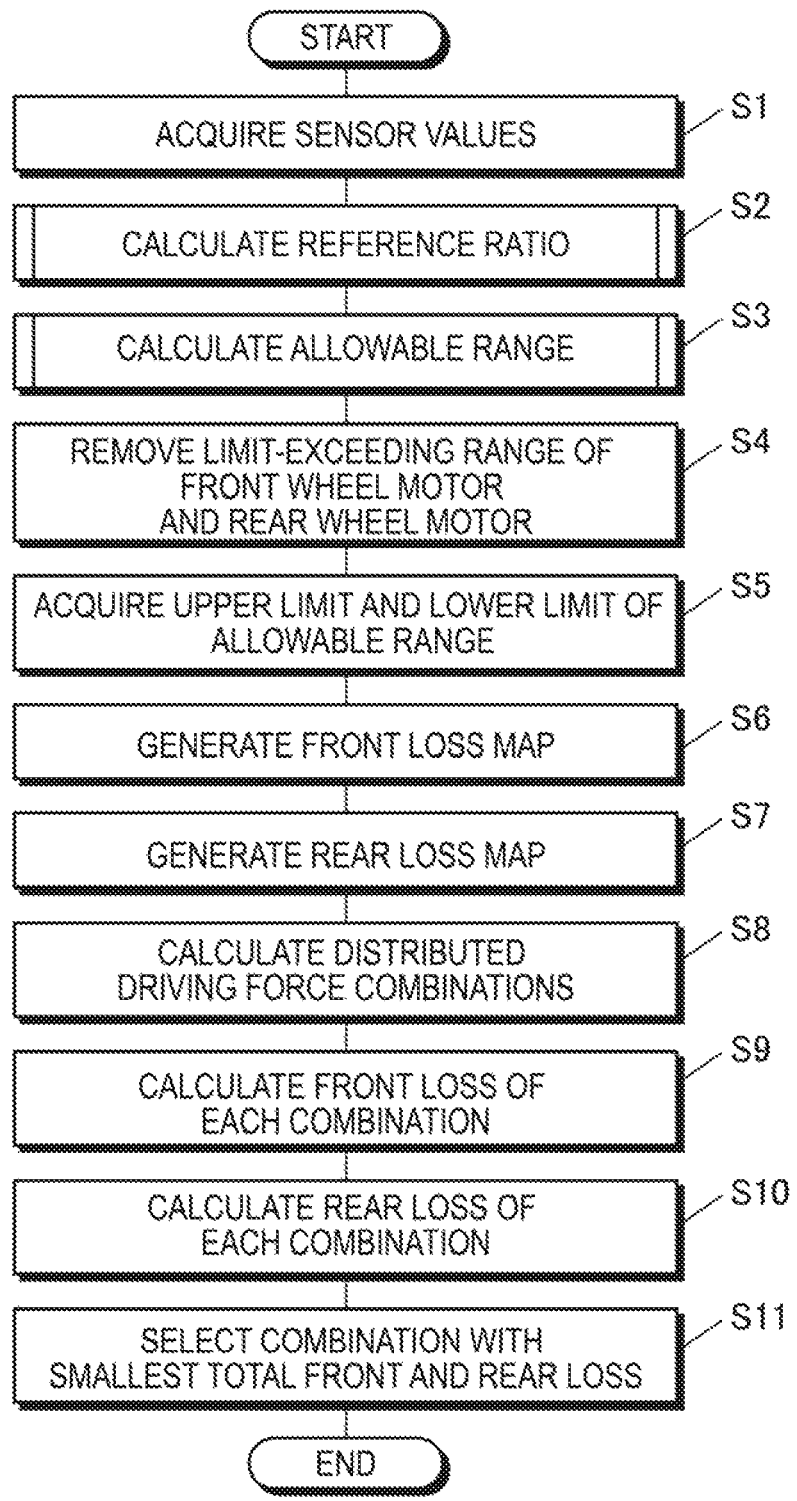
FIG. 3 is a flowchart illustrating an instance of steps in a driving force distribution process executed by the ECU.
Figure 4:
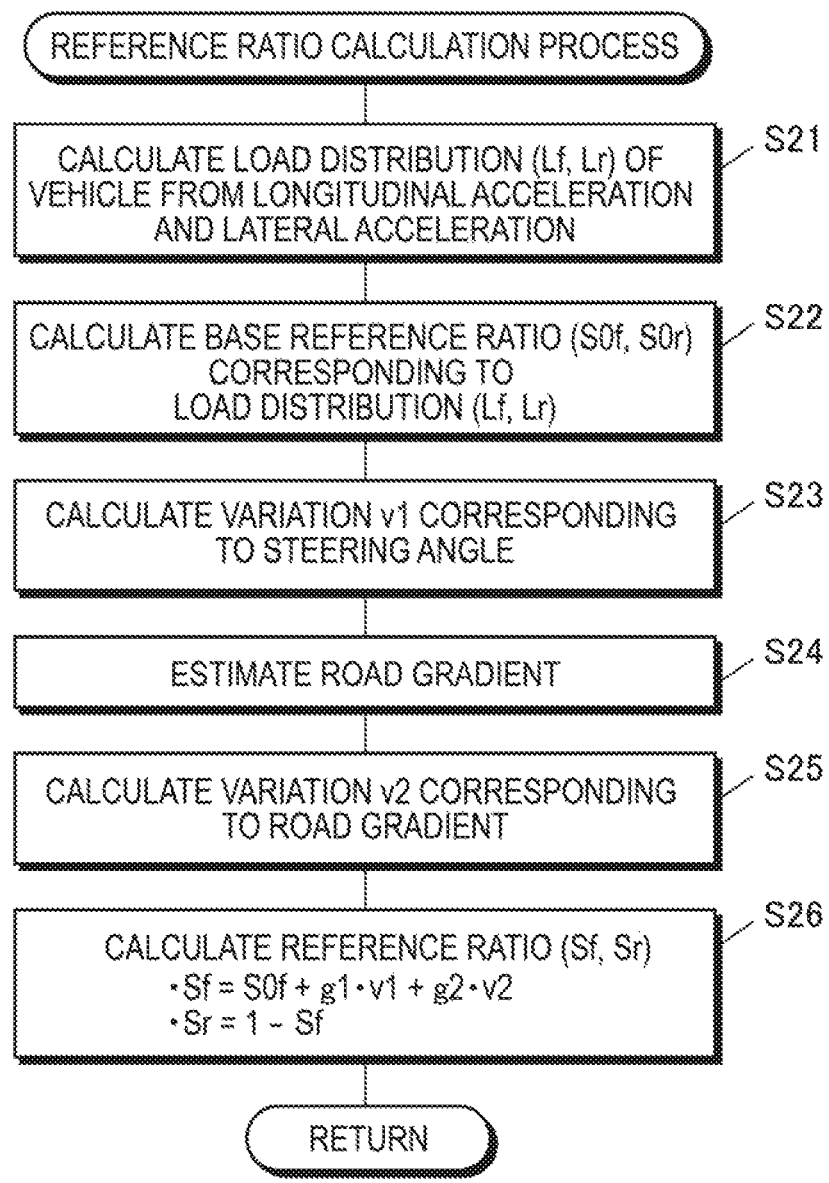
FIG. 4 is a flowchart illustrating the details of a reference ratio calculation process in step S2 in FIG. 3.
Figure 5:
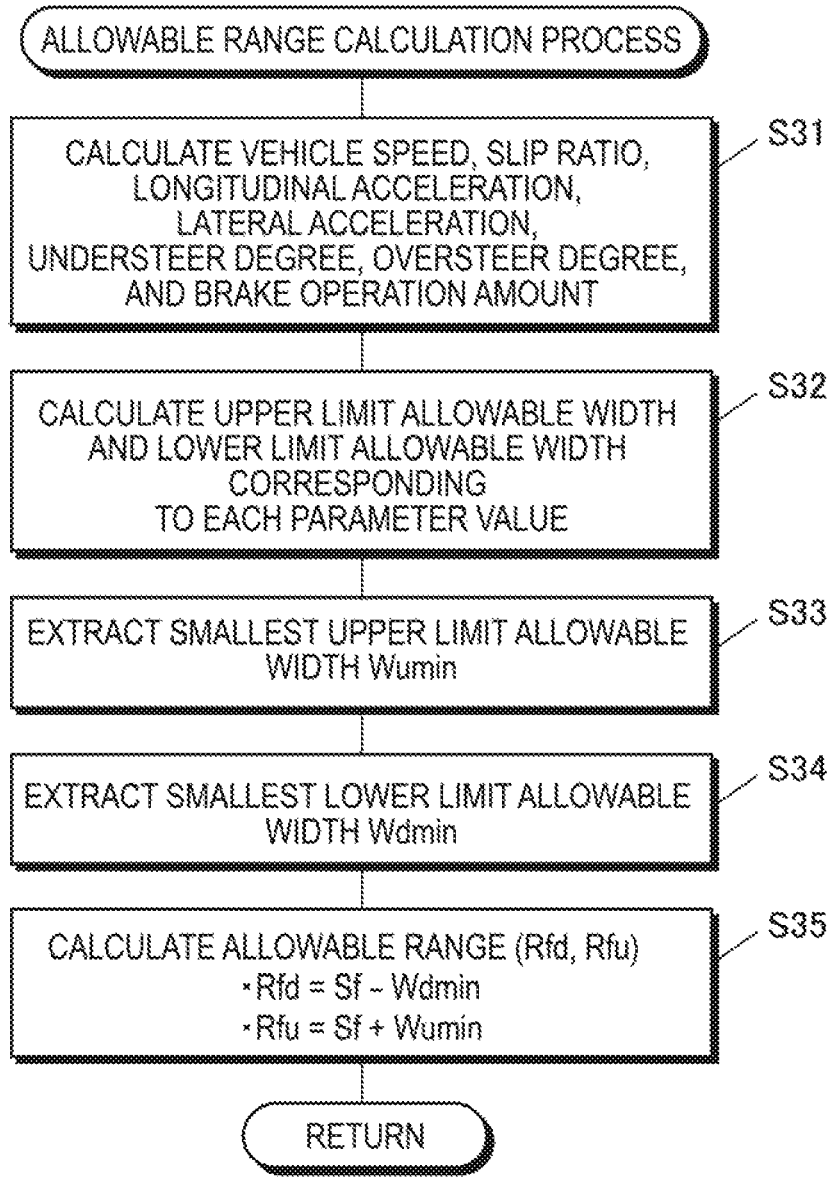
FIG. 5 is a flowchart illustrating the details of an allowable range calculation process in step S3 in FIG. 3.
Figure 6:
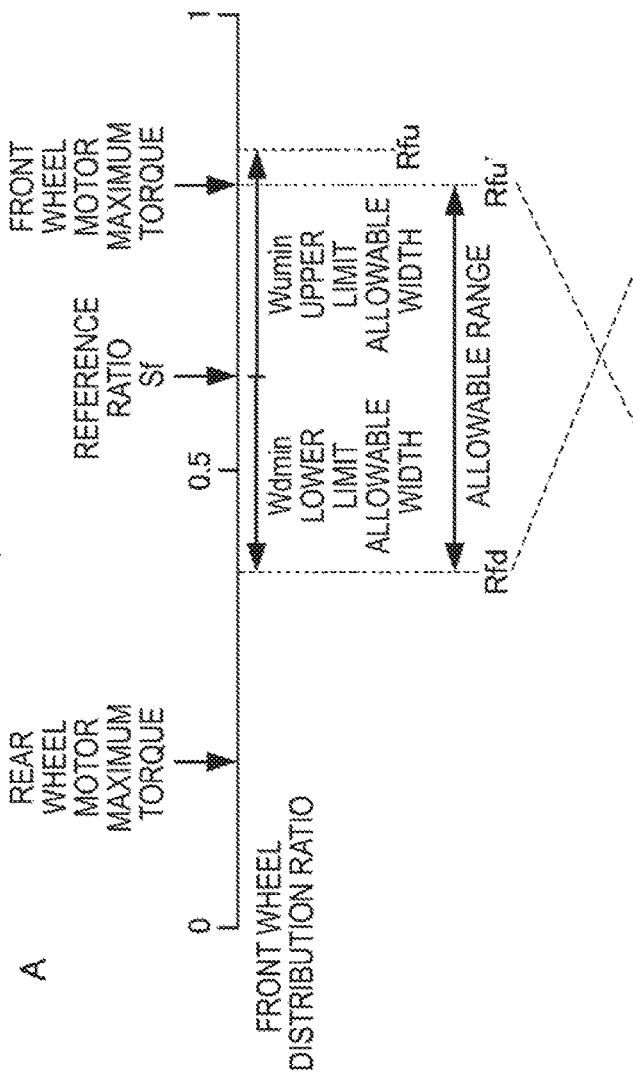
FIG. 6 is a view explaining an instance of the driving force distribution process executed by the ECU, with A of FIG. 6 being a view explaining from the determination of a reference ratio to the setting of an allowable range, and B of FIG. 6 being a view explaining the determination of a target ratio.

FIG. 3 is a flowchart illustrating an instance of the steps in a driving force distribution process executed by the ECU 20. FIG. 4 is a flowchart illustrating the details of a reference ratio calculation process in step S2 in FIG. 3. FIG. 5 is a flowchart illustrating the details of an allowable range calculation process in step S3 in FIG. 3. FIG. 6 is a view illustrating an instance of the driving force distribution process executed by the ECU 20.

The driving force distribution process is repeatedly executed at short cycles, such as every several milliseconds, when the vehicle 1 is in a running mode. When the driving force distribution process starts, the ECU 20 first acquires the sensor values from the group of sensors (31 to 37 and 41 to 46) (step S1). Of these, the sensor value from the accelerator sensor 35, for instance, is received as the required driving force.

Next, the reference determining module 211 calculates a reference ratio (step S2). The reference ratio calculation process determines the reference ratio in accordance with the running state of the vehicle. In the reference ratio calculation process, the reference determining module 211 first calculates a load distribution "Lf, Lr" of the vehicle 1 on the basis of the longitudinal acceleration and the lateral acceleration, of the plurality of acquired sensor values (step S21), as illustrated in FIG. 4. In this case, reference character Lf denotes the load distribution ratio of the left and right front wheels 2, and reference character Lr denotes the load distribution ratio of the left and right rear wheels 3. The load distribution "Lf, Lr" changes depending on the acceleration of the vehicle 1.

Next, the reference determining module 211 calculates a base reference ratio "SOf, SOr" corresponding to the load distribution "Lf, Lr" (step S22). Reference character SOf denotes the base reference ratio of the front wheel 2 side, and reference character SOr denotes the base reference ratio of the rear wheel 3 side. The base reference ratio is the reference ratio before correction, and is set to a value equivalent to the load distribution, for instance. The base reference ratio represents the ideal driving force distribution ratio at which driving stability is highest, when traveling straight ahead on a road with no gradient, for instance.

Continuing on, the reference determining module 211 calculates an individual variation v1 in a reference ratio corresponding to the steering angle (step S23). The ideal driving force distribution ratio changes depending on whether the vehicle is traveling straight or cornering. The variation v1 refers to the variation in the ideal distribution ratio corresponding to the steering angle. A data table showing the relationship between the steering angle and the variation v1 is prepared in advance in the reference determining module 211, and the reference determining module 211 calculates the variation v1 from the steering angle using this data table. The variation v1 in the distribution ratio of the front wheel 2 side is shown here.

Next, the reference determining module 211 estimates the road gradient (step S24). The road gradient may be estimated using well-known technology. For instance, the road gradient may be estimated from the relationship between the accelerator operation amount and the amount of change in vehicle speed. The road gradient estimation process may also be executed by another ECU, and the reference determining module 211 may receive information about the road gradient from the other ECU.

Once the road gradient is estimated, the reference determining module 211 calculates an individual variation v2 in a reference ratio corresponding to the road gradient (step S25). The variation v2 refers to the variation in the ideal distribution ratio corresponding to the road gradient. A data table showing the relationship between the road gradient and the variation v2 is prepared in advance in the reference determining module 211, and the reference determining module 211 calculates the variation v2 from the road gradient using this data table. The variation v2 of the distribution ratio of the front wheel 2 side is shown here.

Once the base reference ratio "SOf, SOr" and the individual variations v1 and v2 corresponding to the running state are calculated, the reference determining module 211 calculates a reference ratio "Sf, Sr" using these (step S26). More specifically, the reference determining module 211 calculates the reference ratio Sf of the front wheel 2 side by performing a calculation in which the individual variations v1 and v2 are integrated into the base reference ratio SOf of the front wheel 2 side. The calculation that integrates the individual variations v1 and v2 is performed by preparing, in advance, weighting coefficients g1 and g2 associated with a plurality of correction parameters (the steering angle and the road gradient), weighting with the coefficients g1 and g2, and then adding the variations v1 and v2. The reference ratio Sr of the rear wheel 3 side is obtained such that the sum of the reference ratio Sr of the rear wheel 3 side and the reference ratio Sf of the front wheel 2 side equals a value of 1, for instance.

The reference ratio "Sf, Sr" obtained in this way corresponds to the load distribution of the vehicle and the individual correction parameters (the steering angle and the road gradient) indicative of the running state, and is thus the ideal distribution ratio to realize high driving stability. In the instance illustrated in FIG. 4, the steering angle and the road gradient are applied as the individual correction parameters indicative of the running state. However, a similar correction may be performed by adding other parameters as long as they are parameters that affect the ideal driving force distribution ratio.

Once the reference ratio is calculated, an allowable range is then calculated by the allowable range setting module 212 in the ECU 20. The allowable range calculation process adds allowable widths Wdmin and Wumin to the reference ratio Sf, as illustrated in A of FIG. 6.

When the process proceeds to the allowable range calculation process, the allowable range setting module 212 first calculates a plurality of parameter values indicative of the running state, on the basis of sensor values received from the running state information input 25 (step S31). The plurality of parameters include, for instance, vehicle speed, slip ratio, longitudinal acceleration, lateral acceleration, understeer degree, oversteer degree, and brake operation amount. The slip ratio can be estimated from the sensor values using well-known slip ratio estimating technology. The understeer degree and oversteer degree can be obtained from the difference between the actual yaw rate which is the detection result from the yaw rate sensor 33, and a predicted yaw rate obtained from the vehicle speed and the steering angle. The slip ratio, the understeer degree, and the oversteer degree may also be calculated by another ECU, and the calculated value then passed on to the allowable range setting module 212.

The plurality of parameters calculated here affect the need for driving stability. For instance, as the vehicle speed increases, the need for driving stability increases, and as the vehicle speed decreases, the need for driving stability decreases. The same is also true for the other parameters.

Next, the allowable range setting module 212 calculates an upper limit allowable width and a lower limit allowable width individually corresponding to each of the values of the plurality of parameters calculated in step S31 (step S32). The upper limit allowable width refers to an allowable width in which the driving force distribution ratio to the front wheels 2 is able to be increased within a range that will not impede driving stability. The lower limit allowable width refers to an allowable width in which the driving force distribution ratio to the rear wheels 3 is able to be increased within a range that will not impede driving stability. The individual parameter values are associated with the upper limit allowable widths and the lower limit allowable widths in advance and the relationships are stored in the allowable range setting module 212 in the form of a data table or a function. These relationships are corresponding relationships in which the allowable width becomes smaller as the need for driving stability increases, and the allowable width becomes greater as the need for driving stability decreases. The allowable range setting module 212 calculates the upper limit allowable width and the lower limit allowable width for each individual parameter using the data table or function described above.

In a running state in which the behavior of the vehicle 1 is stable, the upper limit allowable width and the lower limit allowable width will be the same size. However, in a running state in which the behavior of the vehicle 1 is unstable, such as when there is an understeer tendency or an oversteer tendency, the upper limit allowable width and the lower limit allowable width will not be the same size.

Figure 7:
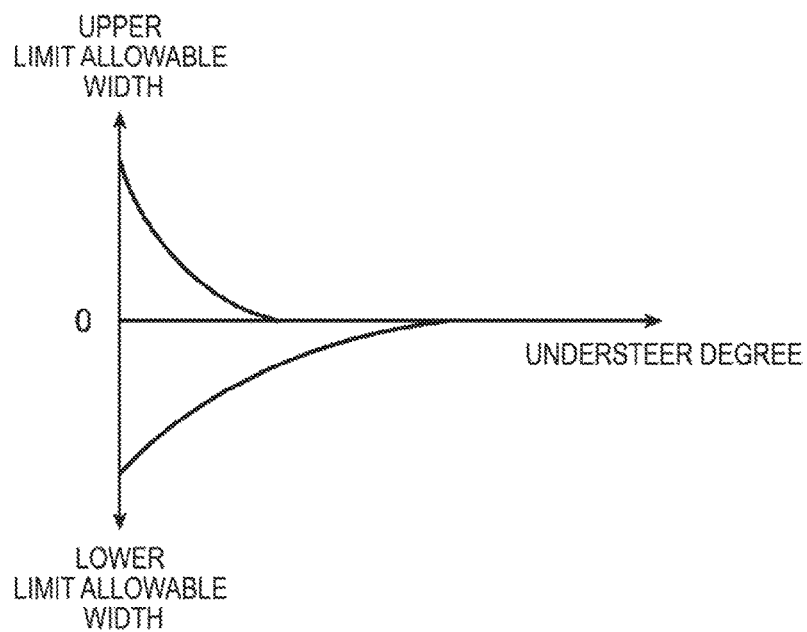
FIG. 7 is a graph explaining instances of an upper limit allowable width and a lower limit allowable width of an allowable range associated with an understeer degree.

FIG. 7 is a graph illustrating an instance of an allowable width associated with an understeer degree. Here, an upper limit allowable width and a lower limit allowable width associated with the understeer degree will be described as an instance. If the driving force ratio of the front wheels 2 were to be increased when the understeer tendency appears weak, it would end up promoting the understeer tendency. Therefore, the allowable width at which the driving force distribution ratio to the front wheels 2 is able to be increased within a range that will not impede driving stability will be smaller than an allowable width at which the driving force distribution ratio to the rear wheels 3 is able to be increased within a range that will not impede driving stability. Therefore, the upper limit allowable width corresponding to the understeer degree is set smaller than the lower limit allowable width, as illustrated in FIG. 7.

Conversely, the upper limit allowable width corresponding to the oversteer degree is set larger than the lower limit allowable width.

After calculating a plurality of upper limit allowable widths and a plurality of lower limit allowable widths corresponding to each of the values of the plurality of parameters, the allowable range setting module 212 extracts the smallest upper limit allowable width Wumin and the smallest lower limit allowable width Wdmin, from among the calculated plurality of upper limit allowable widths and plurality of lower limit allowable widths (steps S33 and S34). The allowable range setting module 212 then calculates an allowable range "Rfd to Rfu" by adding the upper limit allowable width Wumin and the lower limit allowable width Wdmin to the reference ratio Sf (step S35), as illustrated in A of FIG. 6.

Here, the reason for using the smallest upper limit allowable width Wumin and the smallest lower limit allowable width Wdmin is to obtain the allowable width of the distribution ratio so that driving stability will not be impeded, for all of the plurality of parameters calculated in step S31. The allowable range "Rfd to Rfu" calculated in step S35 is the allowable range of the distribution ratio of the front wheel 2 side.

Next, in the ECU 20, a filtering process to remove limit-exceeding ratios from the allowable range is executed by the filtering module 213 (step S4). A limit-exceeding ratio is a distribution ratio that calls for the front wheel motor 11 or the rear wheel motor 12 to output torque exceeding the maximum torque. In the instance illustrated in FIG. 6, the portion on the upper limit side of the allowable range "Rfu to Rfd" calculated in step S3 is a limit-exceeding range that calls for the front wheel motor 11 to output torque exceeding the maximum torque. Therefore, an allowable range "Rfu' to Rfd" that excludes this portion is determined by the process in step S4.

When the allowable range "Rfu' to Rfd" is determined, the upper limit Rfu' and the lower limit Rfd indicating this allowable range are sent to the ratio selecting module 214 (step S5).

Next, the ratio selecting module 214 generates a front loss map (step S6). Here, a loss map for the front wheel motor 11 and a loss map for the front wheel transmission 13 that corresponds to the gear position, which are stored in the base loss map memory 26, are first temperature corrected. Then these corrected loss maps are combined to generate a front loss map.

Figure 8:
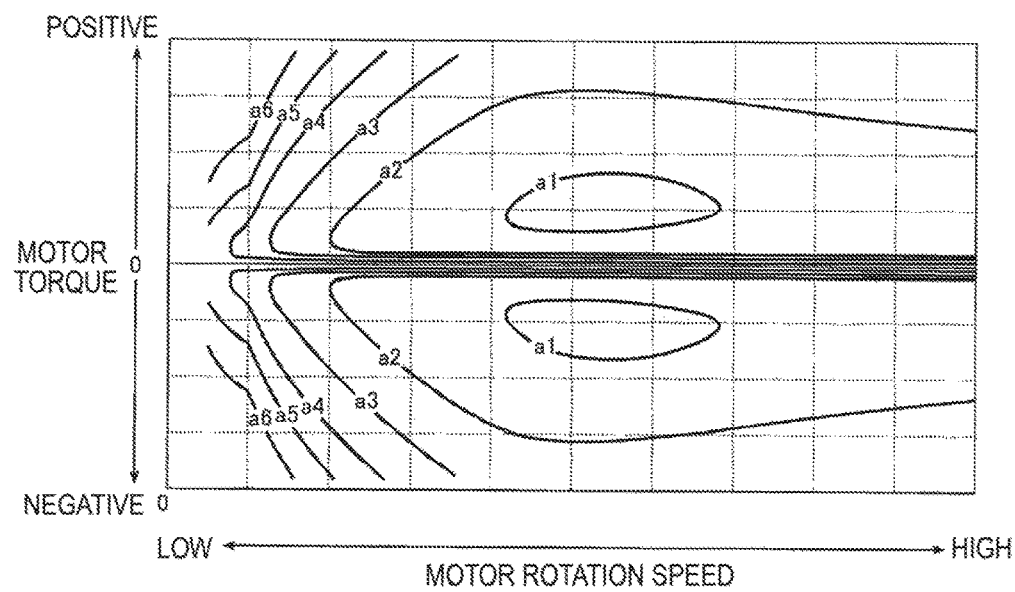
FIG. 8 is a graph illustrating an instance of a front loss map generated by a ratio selecting module.

FIG. 8 is a graph illustrating an instance of the front loss map. The front loss map generated in this way indicates the relationships among motor rotation speed, motor torque, and loss a1 to a6, as illustrated in FIG. 8, for instance.

Continuing on, the ratio selecting module 214 similarly generates a rear loss map (step S7).

Next, the ratio selecting module 214 calculates a plurality of driving force combinations when the required driving force of the front wheels 2 and the rear wheels 3 is distributed at a plurality of distribution ratios in the allowable range "Rfu' to Rfd" (step S8). In the instance illustrated in B of FIG. 6, combinations E1 that include Combination Nos. 4 to 7 are calculated corresponding to an allowable range "40% to 80%". The driving force combinations are preferably extracted from all over the allowable range.

The driving force combinations may be selected in accordance with a plurality of ratios extracted at equally spaced intervals from the allowable range. Alternatively, the driving force combinations may be selected in accordance with a plurality of ratios that have been densely extracted in areas close to the reference ratio, and sparsely extracted in areas far from the reference ratio, within the allowable range. As described above, the reference ratio is the ideal reference ratio at which driving stability is highest. Also, the distribution ratio of the driving force is such that driving stability typically decreases farther away from the reference ratio. On the other hand, with energy loss, there are cases in which there are minimal values in a plurality of ranges, such as one minimal value in an area close to the reference ratio, and another minimal value in an area far from the reference ratio, for instance. In such a case, a driving force combination with low energy loss that is in an area close to the reference ratio is better than the driving force combination with low energy loss that is in the area far from the reference ratio. Therefore, by densely extracting driving force combinations in an area close to the reference ratio as described above, a driving force combination with low energy loss in an area close to the reference ratio, when there is such a combination, is less likely to be overlooked. As a result, a better driving force combination is able to be more reliably applied.

Also, the driving force combinations may be extracted changing the degree of density in accordance with the state of the vehicle. More specifically, when the driving stability is high, the allowable range is wide, so the ratio selecting module 214 sparsely extracts driving force combinations from the entire allowable range. Also, when driving stability is low, the allowable range is narrow, so the ratio selecting module 214 densely extracts driving force combinations from the entire allowable range. As a result, the number of extracted driving force combinations is inhibited from becoming extremely large when the allowable range is wide, which enables the calculation processing load to be reduced. Moreover, the number of extracted driving force combinations is inhibited from being extremely small when the allowable range is narrow, so a better driving force combination that achieves both driving stability and energy efficiency is able to be applied.

After calculating the plurality of combinations, the ratio selecting module 214 obtains the torque for the front wheel motor 11 from the driving force of the front wheels 2 for each combination. Moreover, the ratio selecting module 214 obtains the current rotation speed of the front wheel motor 11. The ratio selecting module 214 then calculates, from these values and the front loss map, the energy loss in the front wheel motor 11 and the front wheel transmission 13 corresponding to the driving force of the front wheels 2 for the plurality of combinations (step S9). This energy loss will be referred to as "front loss".

Similarly, the ratio selecting module 214 obtains the torque for the rear wheel motor 12 from the driving force of the rear wheels 3 for each combination. Moreover, the ratio selecting module 214 obtains the current rotation speed of the rear wheel motor 12. The ratio selecting module 214 then calculates, from these values and the rear loss map, the energy loss in the rear wheel motor 12 and the rear wheel transmission 14 corresponding to the driving force of the rear wheels 3 for the plurality of combinations (step S10). This energy loss will be referred to as "rear loss".

Continuing on, the ratio selecting module 214 calculates the total loss, which is the sum of the front loss and the rear loss for each of the plurality of combinations calculated in step S8. Then the ratio selecting module 214 selects the one driving force combination with the smallest total loss as the target driving force of the front wheels 2 and the target driving force of the rear wheels 3 (step S11). In the instance illustrated in B of FIG. 6, combination E11 having the distribution ratio of Combination No. 5 is selected. Here, the target driving force of the front wheels 2 and the rear wheels 3 corresponds to the driving force combination in which the required driving force is distributed in accordance with the target ratio, so the process in step S11 corresponds to the process of selecting the target ratio.

Then, one cycle of the driving force distribution process by the ratio determination unit 21 ends.

When the driving force distribution process ends, the ratio selecting module 214 sends the driving force of the one selected combination to the command unit 22 as the target driving force of the front wheels 2 and the target driving force of the rear wheels 3. This is equivalent to sending, to the command unit 22, the required driving force and information about the target ratio at which this required driving force is to be distributed.

When the target driving force is sent to the command unit 22, the command unit 22 calculates the target torque of the front wheel motor 11 that generates the target driving force in the front wheels 2, and the target torque of the rear wheel motor 12 that generates the target driving force in the rear wheels 3. Then, the command unit 22 outputs a command to generate these target torques to the front wheel drive circuit 15 and the rear wheel drive circuit 16. As a result, in the next control cycle, the target torques will be output from the front wheel motor 11 and the rear wheel motor 12, such that the target driving forces will be output from the front wheels 2 and the rear wheels 3.

The driving forces of the front wheels 2 and the rear wheels 3 output in this way satisfy the required driving force corresponding to a driving operation by the driver, and achieve both energy efficiency and driving stability of the vehicle 1. Furthermore, these driving forces give priority to energy efficiency within a range in which driving stability will not be impeded, when the running state is such that there is some leeway in the driving stability. Also, these driving forces improve energy efficiency within a range in which driving stability will not be impeded, while giving priority to driving stability, when the running state is such that there is not much leeway in the driving stability.

As described above, the driving force control apparatus 100 of the vehicle 1 according to this example first sets the allowable range of the ratio at which the required driving force is to be distributed, and then selects, as the target ratio, a distribution ratio in which the energy loss decreases from this allowable range. Such a process makes it possible to distribute the required driving force in such a manner that improves both driving stability and energy efficiency.

Also, with the driving force control apparatus 100 of the vehicle 1 according to this example, the reference ratio that serves as the reference for the allowable range is calculated to change in accordance with the running state. As a result, a reference range that increases the driving stability in accordance with the driving state is able to be set. Also, the reference determining module 211 calculates the reference ratio (Sf, Sr) by obtaining the variations v1 and v2 individually corresponding to each of a plurality of types of parameters (the steering angle and the road gradient) that affect driving stability, and then integrating these variations v1 and v2. Also, when integrating the individual variations v1 and v2, the reference ratio (Sf, Sr) is calculated by the sum that is weighted by the coefficients g1 and g2. Therefore, a reference ratio with which high driving stability is able to be obtained can be calculated accurately and without much difficulty, comprehensively taking into account the plurality of types of parameters.

Also, with the driving force control apparatus 100 of the vehicle 1 according to this example, the allowable widths on the upper limit side and the lower limit side that determine the extent of the allowable range change in accordance with the running state. As a result, when the running state is such that priority should be given to driving stability, the allowable range can be made narrower and a distribution ratio giving priority to driving stability can be selected as the target ratio. Also, when the running state is such that priority can be given to energy efficiency, the allowable range can be made wider and a distribution ratio giving priority to energy efficiency can be selected as the target ratio. Further, in this example, a plurality of types of parameters are used as the parameters that affect the priority of driving stability. In this example, these parameters are vehicle speed, slip ratio, longitudinal acceleration, lateral acceleration, understeer degree, oversteer degree, and brake operation amount. Also, the allowable range setting module 212 obtains an individual allowable width associated with the value of each parameter, and calculates the allowable range using the smallest allowable width. Therefore, an allowable range corresponding to the values of the plurality of types of parameters is able to be calculated without much difficulty.

Also, the allowable range setting module 212 calculates the upper limit allowable width and the lower limit allowable width separately. Consequently, when the amount of leeway in the driving stability is different when increasing the distribution ratio of the front wheels 2 than it is when increasing the distribution ratio of the rear wheels 3, as it is in the case when there is an understeer tendency or an oversteer tendency, for example, an allowable range suitable for these is able to be set.

Also, with the driving force control apparatus 100 of the vehicle 1 according to the example, if the allowable range includes limit-exceeding ratios that require the front wheel motor 11 or the rear wheel motor 12 to output torque exceeding the maximum torque, the filtering module 213 removes these ratios from the allowable range. Therefore, needless calculations regarding distribution ratios that will not be selected are able to be omitted when calculating the overall energy loss.

While an example of the present invention has been described above, the present invention is in no way limited to this example. For instance, in the example described above, the front wheel motor 11 and the rear wheel motor 12 are applied as the plurality of drive sources. However, the plurality of drive sources are not limited to motors and may also include an engine. That is, the vehicle may be an electric vehicle (EV), a hybrid vehicle (HV), a hybrid electric vehicle (HEV), or a fuel cell vehicle (FCV).

Also, the example describes an instance in which driving force is distributed between the front wheels 2 and the rear wheels 3. However, the combination of wheels among which the driving force is distributed may be changed as necessary, e.g., each of front, rear, and left and right wheels individually, or each of three groups of wheels, one group consisting of two rear wheels, another group consisting of a left front wheel, and the remaining group consisting of a right front wheel.

Also, the example gives the front wheel transmission 13 and the rear wheel transmission 14 as power transmission mechanisms, but the transmissions may be omitted. For instance, a power transmission mechanism having a constant reduction gear ratio may be provided. Also, for instance, in an electric vehicle having a gear reduction in-wheel motor in each of a plurality of wheels, the reduction gear serves as a power transmission mechanism. Further, in an electric vehicle having a direct drive in-wheel motor, a motor output shaft, a rotating shaft of a wheel, and bearings of these shafts, and the like serve as power transmission mechanisms.

Also, in the example described above, the steering angle and the road gradient are given as the plurality of types of parameters that affect the reference ratio, but the parameters are not limited to these and may also be parameters indicative of another running state. Further, in the example described above, various parameters such as vehicle speed, slip ratio, and longitudinal acceleration are given as the plurality of types of parameters that affect the allowable width of the allowable range, but parameters indicative of another running state may also be used. Also, a function value in which two of these parameters are combined may also be treated as a single parameter.

Moreover, in the example described above, the combined loss of the losses in the front wheel motor 11, the rear wheel motor 12, the front wheel transmission 13, and the rear wheel transmission 14 is applied as the running energy loss. However, the running energy loss may also include loss in another part, such as loss in a drive circuit of a motor, or loss in a battery.

Also, in the example described above, the allowable range of the driving force distribution ratio is calculated by adding the allowable width to the reference ratio, but the method by which the allowable range is calculated is not limited to this. For instance, the range of a distribution ratio in which the driving stability increases in accordance with the running state may also be directly obtained as the allowable range.

Furthermore, in the example described above, the ratio selecting module 214 selects the distribution ratio (driving force combination) with the smallest energy loss from the allowable range. However, the ratio selecting module 214 need only select a distribution ratio with a low energy loss from the allowable range, for instance. For instance, the ratio selecting module 214 may select a distribution ratio with a lower energy loss than at least one other distribution ratio, from the allowable range. Such a configuration prevents the distribution ratio with the highest energy loss from being selected, and thus also enables both driving stability and energy efficiency to be achieved at the same time. Such a configuration is effective when determining the distribution ratio by further including other different types of conditions, for example. Also, the ratio selecting module 214 may select a distribution ratio with a lower energy loss than the reference ratio, from the allowable range. If the reference ratio has the lowest energy loss, then the ratio selecting module 214 may select the reference ratio. For instance, such a configuration also enables both driving stability and energy efficiency to be achieved at the same time because a distribution ratio with a lower energy loss than the reference ratio, or the distribution ratio with the lowest energy loss, is selected. Further, the plurality of functional blocks realized by a single ECU may be realized divided among a plurality of ECUs. Moreover, the details of this example may be modified as appropriate without departing from the scope of the invention.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A vehicle driving force control apparatus mounted in a vehicle provided with a plurality of drive sources, and a plurality of power transmission mechanisms configured to transmit power from the plurality of drive sources to a plurality of wheels or a plurality of sets of wheels, the vehicle driving force control apparatus comprising:
  a ratio determination unit configured to determine a target ratio at which a required driving force applied to the vehicle is to be distributed to the plurality of wheels or the plurality of sets of wheels; and
  a command unit configured to command the plurality of drive sources to output power such that driving force distributed in accordance with the target ratio is generated in the plurality of wheels or the plurality of sets of wheels,
    wherein the ratio determination unit comprises a reference determining module configured to determine a reference ratio that serves as a reference for a distribution ratio of the required driving force, an allowable range setting module configured to set an allowable range in which a predetermined allowable width is added to the reference ratio, and a ratio selecting module capable of selecting, from the allowable range, a distribution ratio having a running energy loss that is at least less than the running energy loss of the reference ratio, and
    the distribution ratio selected by the ratio selecting module is made the target ratio.

2. The vehicle driving force control apparatus according to claim 1, wherein the reference determining module changes the reference ratio in accordance with a running state of the vehicle.

3. The vehicle driving force control apparatus according to claim 2, wherein the reference determining module obtains a plurality of individual variations in the reference ratio associated with values of individual parameters, from among a plurality of types of parameters indicative of the running state, and then obtains an overall variation in the reference ratio by performing a calculation in which the plurality of individual variations obtained for each of the plurality of types of parameters are integrated.

4. The vehicle driving force control apparatus according to claim 3, wherein the calculation in which the plurality of individual variations are integrated is an addition of the plurality of individual variations that have been weighted in association with each of the plurality of types of parameters.

5. The vehicle driving force control apparatus according to claim 2, wherein the allowable range setting module changes a width of the predetermined allowable width in accordance with the running state of the vehicle.

6. The vehicle driving force control apparatus according to claim 5, wherein the allowable range setting module obtains each of a plurality of individual widths of the predetermined allowable width associated with each value of individual parameters, from among a plurality of types of parameters indicative of the running state, and sets the allowable range using a smallest width, from among the plurality of individual widths obtained for each of the plurality of types of parameters.

7. The vehicle driving force control apparatus according to claim 5, wherein
  the plurality of drive sources comprise a front wheel drive source configured to generate a power in a front wheel, and a rear wheel drive source configured to generate a power in a rear wheel, and
  the allowable range setting module is able to change the width of the predetermined allowable width on an upper limit side where a distribution ratio to the front wheel drive source increases, and the width of the predetermined allowable width on a lower limit side where a distribution ratio to the rear wheel drive source increases, separately in accordance with the running state.

8. The vehicle driving force control apparatus according to claim 7, further comprising:
  a steering angle sensor configured to detect a steering angle of the vehicle;
  a wheel speed sensor configured to detect a wheel speed of the vehicle; and
  a yaw rate sensor configured to detect an actual yaw rate of the vehicle, wherein
    the allowable range setting module makes the width on the upper limit side larger than the width on the lower limit side when detection results from the steering angle sensor, the wheel speed sensor, and the yaw rate sensor indicate an understeer tendency.

9. The vehicle driving force control apparatus according to claim 2, wherein
  the ratio determination unit further comprises a filtering module configured to remove, from the allowable range, a limit-exceeding ratio that causes at least one of the plurality of drive sources to generate an output exceeding a limit, when the allowable range comprises the limit-exceeding ratio, and
  the ratio selecting module selects a distribution ratio from the allowable range from which the limit-exceeding ratio has been removed by the filtering module.

10. The vehicle driving force control apparatus according to claim 1, wherein the allowable range setting module changes a width of the predetermined allowable width in accordance with a running state of the vehicle.

11. The vehicle driving force control apparatus according to claim 10, wherein the allowable range setting module obtains each of a plurality of individual widths of the predetermined allowable width associated with each value of individual parameters, from among a plurality of types of parameters indicative of the running state, and sets the allowable range using a smallest width, from among the plurality of individual widths obtained for each of the plurality of types of parameters.

12. The vehicle driving force control apparatus according to claim 10, wherein
  the plurality of drive sources comprise a front wheel drive source configured to generate a power in a front wheel, and a rear wheel drive source configured to generate a power in a rear wheel, and
  the allowable range setting module is able to change the width of the predetermined allowable width on an upper limit side where a distribution ratio to the front wheel drive source increases, and the width of the predetermined allowable width on a lower limit side where a distribution ratio to the rear wheel drive source increases, separately in accordance with the running state.

13. The vehicle driving force control apparatus according to claim 12, further comprising:
  a steering angle sensor configured to detect a steering angle of the vehicle;
  a wheel speed sensor configured to detect a wheel speed of the vehicle; and
  a yaw rate sensor configured to detect an actual yaw rate of the vehicle, wherein
    the allowable range setting module makes the width on the upper limit side larger than the width on the lower limit side when detection results from the steering angle sensor, the wheel speed sensor, and the yaw rate sensor indicate an understeer tendency.

14. The vehicle driving force control apparatus according to claim 1, wherein
the ratio determination unit further comprises a filtering module configured to remove, from the allowable range, a limit-exceeding ratio that causes at least one of the plurality of drive sources to generate an output exceeding a limit, when the allowable range comprises the limit-exceeding ratio, and
the ratio selecting module selects a distribution ratio from the allowable range from which the limit-exceeding ratio has been removed by the filtering module.

15. A vehicle driving force control apparatus mounted in a vehicle that runs by transmitting power from a plurality of drive sources to a plurality of wheels or a plurality of sets of wheels, the vehicle driving force control apparatus comprising:
a ratio determination unit configured to determine a target ratio at which a required driving force applied to the vehicle is to be distributed to the plurality of wheels or the plurality of sets of wheels; and
a command unit configured to command the plurality of drive sources to output power such that driving force distributed in accordance with the target ratio is generated in the plurality of wheels or the plurality of sets of wheels,
wherein the ratio determination unit comprises an allowable range setting module configured to set an allowable range of a ratio at which the required driving force is to be distributed, on the basis of a running state of the vehicle, and a ratio selecting module configured to select one distribution ratio from the allowable range such that a running energy loss decreases, and
the distribution ratio selected by the ratio selecting module is made the target ratio.

16. A vehicle driving force control apparatus mounted in a vehicle provided with a plurality of drive sources, and a plurality of power transmission mechanisms configured to transmit power from the plurality of drive sources to a plurality of wheels or a plurality of sets of wheels, the vehicle driving force control apparatus comprising:
an electronic control unit (ECU) configured to:
determine a reference ratio that serves as a reference for a distribution ratio of a required driving force applied to the vehicle;
set an allowable range in which a predetermined allowable width is added to the reference ratio;
select, from the allowable range, the distribution ratio having a running energy loss that is at least less than a running energy loss of the reference ratio;
determine, based on the selected distribution ratio, a target ratio at which the required driving force applied to the vehicle is to be distributed to the plurality of wheels or the plurality of sets of wheels; and
command the plurality of drive sources to output power such that driving force distributed in accordance with the target ratio is generated in the plurality of wheels or the plurality of sets of wheels.

* * * * *